United States Patent [19]

Bunnell et al.

[11] 4,224,464
[45] Sep. 23, 1980

[54] LIQUID TIGHT CONNECTOR

[75] Inventors: Edward D. Bunnell, Palm Harbor; Thomas J. Sotolongo, Clearwater Beach, both of Fla.

[73] Assignee: AMP Incorporated, Harrisburg, Pa.

[21] Appl. No.: 954,373

[22] Filed: Oct. 24, 1978

[51] Int. Cl.² ............................................. F16L 5/02
[52] U.S. Cl. ................................. 174/65 R; 174/78; 285/161
[58] Field of Search .................. 285/161, 158, 247; 174/65 R, 65 SS, 78

[56] References Cited

U.S. PATENT DOCUMENTS

| | | | |
|---|---|---|---|
| 3,104,120 | 9/1963 | Myers | 285/161 |
| 3,492,410 | 1/1970 | Kelly | 174/78 |
| 3,493,672 | 2/1970 | Bromberg | 285/161 X |
| 3,549,177 | 12/1970 | Sotolongo | 285/161 X |
| 3,603,912 | 9/1971 | Kelly | 174/65 SS X |
| 3,791,680 | 2/1974 | Cleare | 174/78 X |
| 3,897,089 | 7/1975 | Leichsenring et al. | 285/158 |
| 3,902,745 | 9/1975 | Mooney et al. | 285/247 |
| 3,964,772 | 6/1976 | Cox, Jr. | 285/161 X |

FOREIGN PATENT DOCUMENTS 1285677  1/1962  France ............................. 285/158

*Primary Examiner*—Thomas F. Callaghan
*Attorney, Agent, or Firm*—Russell J. Egan

[57] ABSTRACT

The disclosure is directed to a pre-assembled liquid tight connector for use with flexible jacketed metallic conduit. The connector is comprised of a body member, an electrical ground sleeve, an O-Ring and a gland nut which are assembled as a single unit by flaring the ground sleeve over the body member. The end product is a unitized liquid tight connector which is easy to apply.

5 Claims, 5 Drawing Figures

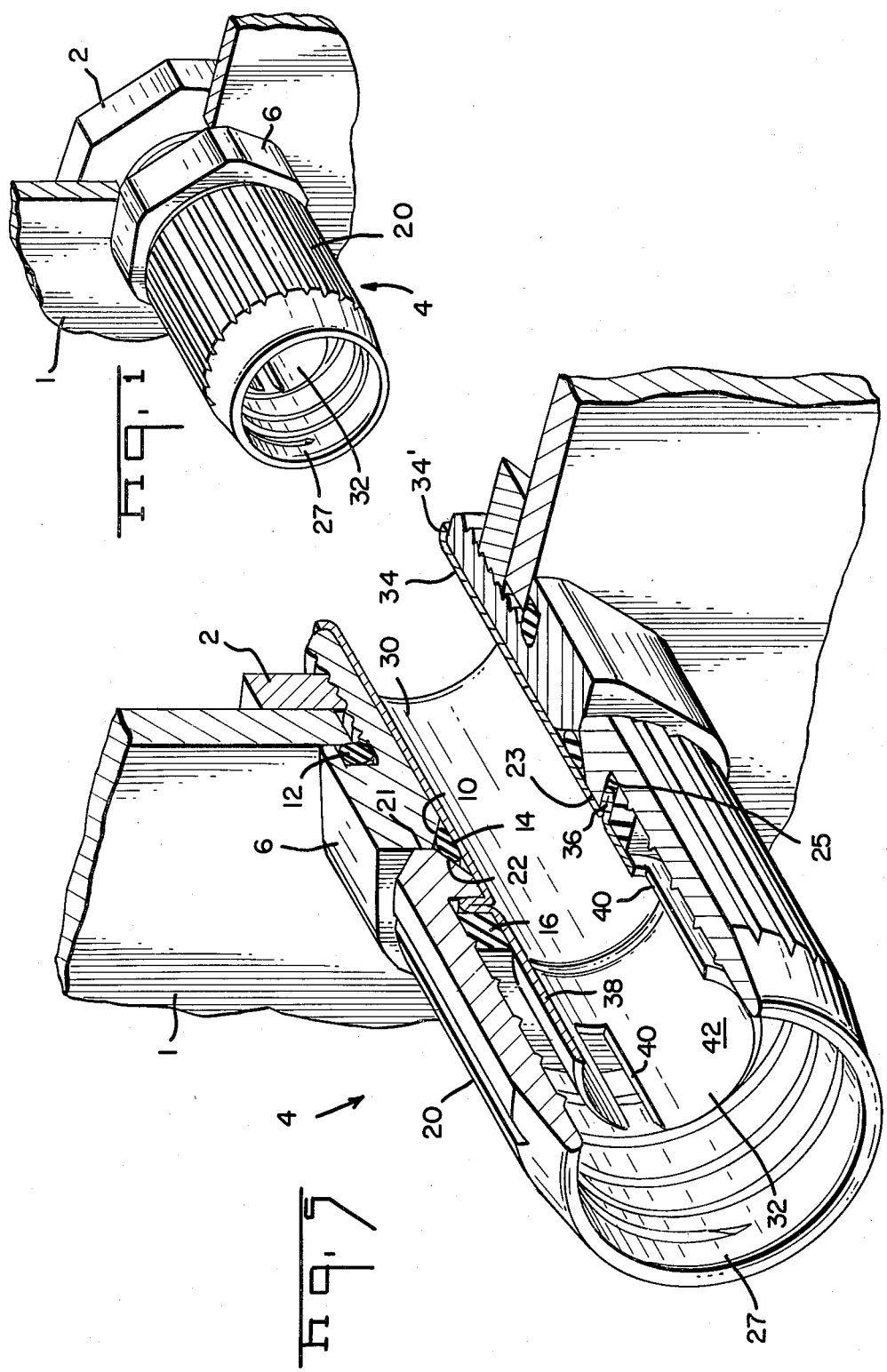

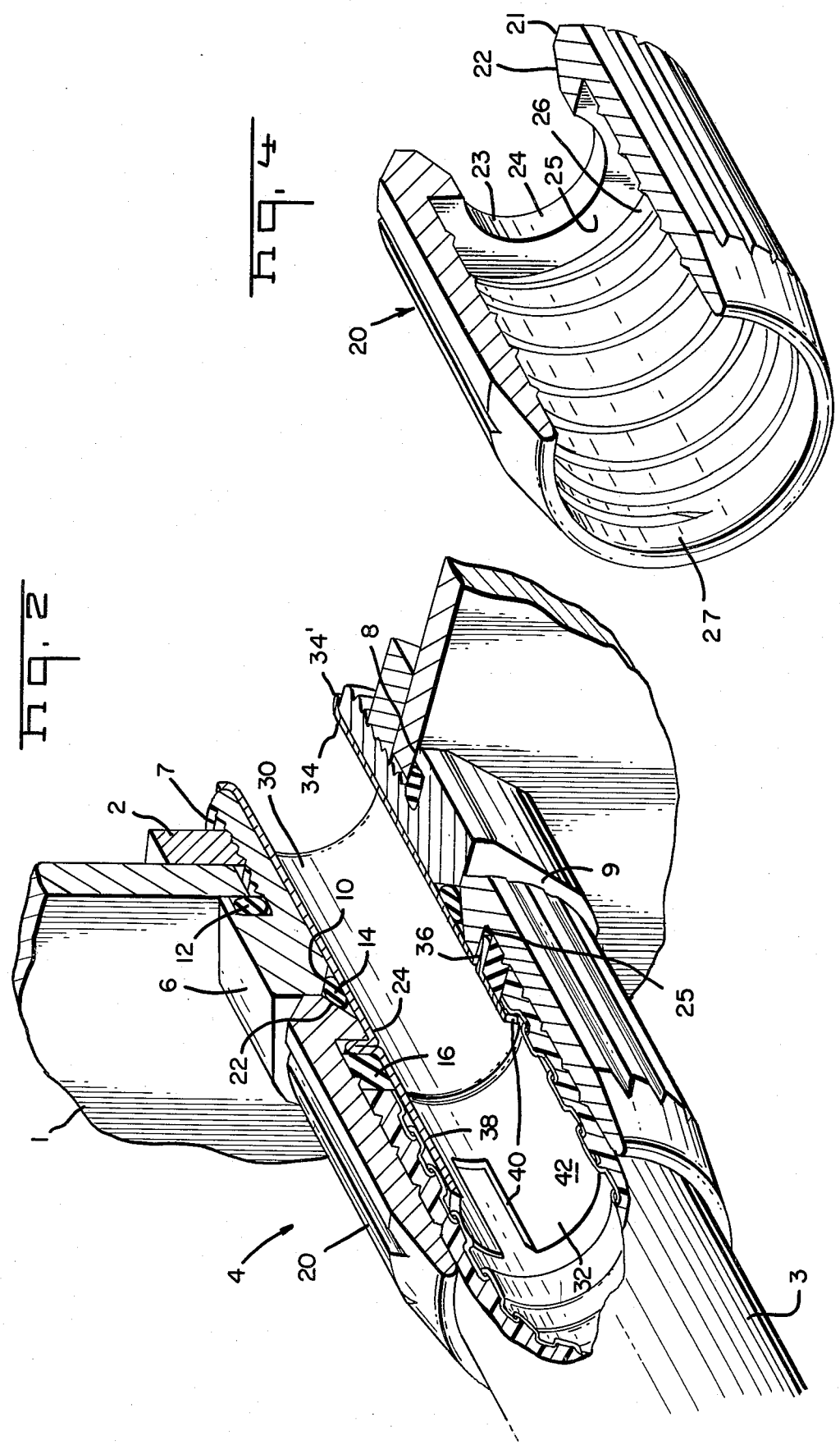

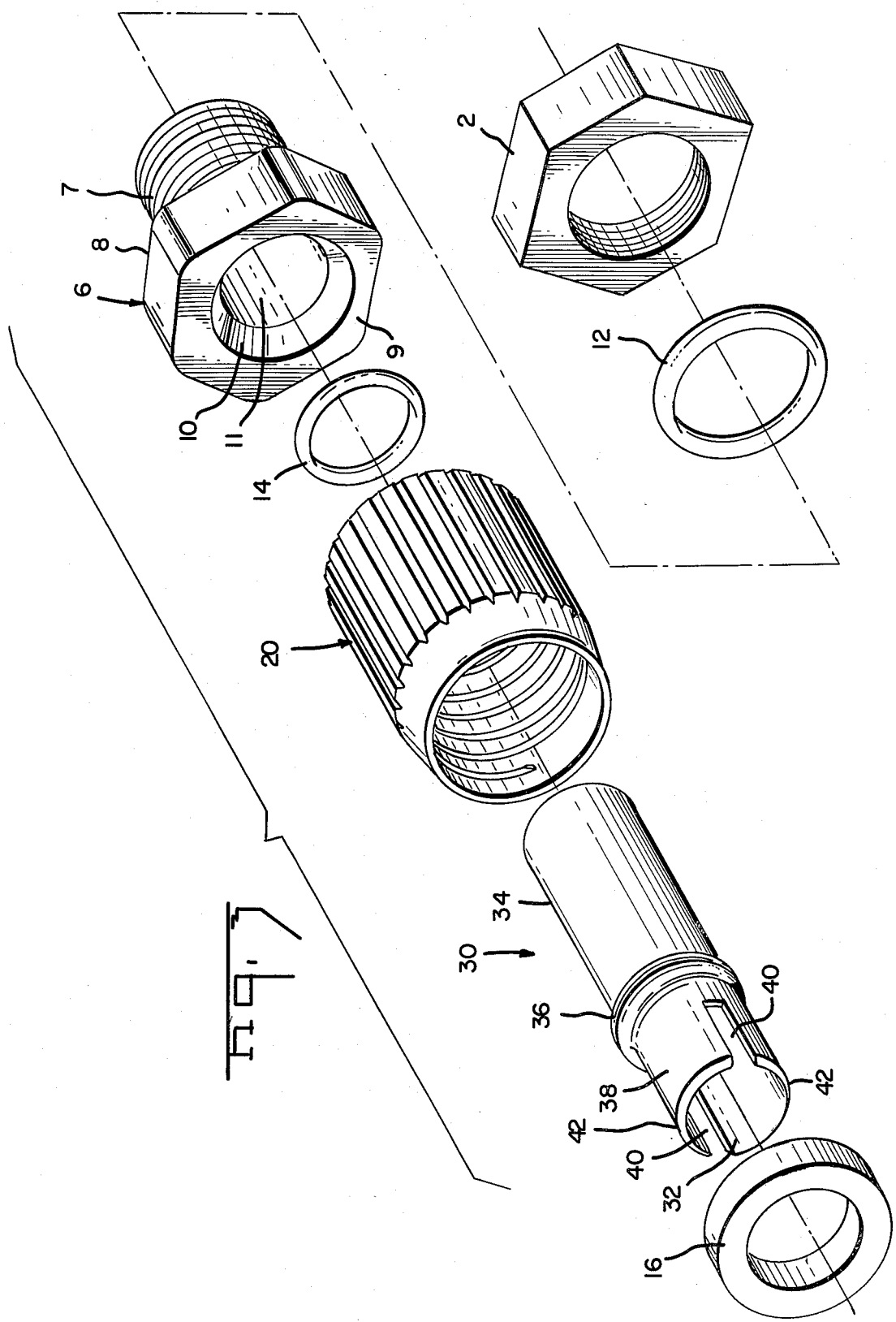

LIQUID TIGHT CONNECTOR

BACKGROUND

1. Field of the Invention

The instant invention is useful in the field of coupling flexible metallic conduit to electrical enclosures and more particularly to coupling jacketed flexible metallic conduit to electrical enclosures in a manner which provides both a liquid tight connection and a means for grounding of the metallic conduit to the electrical enclosure.

2. Description of the Prior Art

Prior art devices generally require at least four separate elements to construct a connector. The elements generally required are a body for attachment to the electrical enclosure, a grounding sleeve, a sealing ring, and a gland nut. Thus, each connector is constructed of separate parts which must be assembled prior to or during installation. Additionally, the mechanic assembling the connector must exercise care to avoid overtightening of the gland and the associated destruction of the sealing ring.

SUMMARY OF THE INVENTION

The present invention overcomes the prior art difficulties through its unitized construction. The electrical ground sleeve used in the instant connector provides both improved ground continuity and a means of assembling the connector unit. The rotatable gland nut is advantageously secured so as to provide easy assembly and achieve a liquid tight connection.

It is the primary object of this invention to provide an improved liquid tight connector which is stored and applied with greater ease.

It is a further object of this invention to provide a connector which may be applied to the cable before or after securing the connector to a panel.

BRIEF DESCRIPTION OF THE DRAWINGS

FIG. 1 is a perspective view showing a connector, according to the instant invention, mounted in a panel.

FIG. 2 shows a connector with jacketed flexible metallic conduit located therein (all conductors have been omitted for clarity).

FIG. 3 is an exploded perspective view according to the instant invention.

FIG. 4 is a partial sectional view of the gland according to the instant invention.

FIG. 5 is a partial sectional view of FIG. 1.

FIG. 1 shows a connector 4 according to the instant invention secured to a panel. FIG. 2 shows the connector 4 as applied to standard jacket flexible metal conduit 3. The construction of conduit 3 is well known to those skilled in the art and needs no explanation herein.

Referring now to FIG. 3, there is shown an exploded view of a connector according to the present invention. Body member 6 is formed of conductive material such as cast metal. Body member 6 has a threaded projection 7 which is dimensioned to pass through an aperture in the panel 1 and be secure thereto with lock nut 2. Immediately adjacent threaded portion 7, recess 8 is dimensioned to receive O-Ring 12 (as clearly shown in FIG. 2). Recess 8 is dimensioned to permit some compression of O-Ring 12 when threaded portion 7 is secured to panel 1 and then to abut the panel to prevent overtightening and distortion of O-Ring 12. O-Ring 12 and nut 2 may be eliminated by providing threaded portion 7 with a National Pipe thread which is a tapered thread yielding a liquid tight compressive fit. Body 6 at the end opposite threaded portion 7 has a flat surface 9. Countersink 10 extends from the interior circumference of flat surface 9 inward to the passageway 11 which extends throughout body 6. Passageway 11 is dimensioned to receive therein sleeve 30.

Turning now to FIG. 4, there is shown a partial section of gland 20. Gland 20 has at a first end a flat bearing surface 21 for moving over surface 9 during assembly of the connector to cable conduit. A countersink 22 extends from the interior edge of surface 21 to shoulder portion 23. Countersink 22 compliments countersink 10 and together they provide two sides of the cavity within which O-Ring 14 is located. O-Ring 14 is compressed to achieve a liquid tight seal when gland 20 is assembled to abut surface 9. This condition is clearly shown in FIG. 5. Ideally, the respective countersinks are dimensioned to compress O-Ring 14 without excessive distortion. Additionally, O-Ring 14 may be coated with a suitable lubricant to prevent distortion when gland 20 is rotated relative to body 9.

Referring again to FIG. 4, shoulder portion 23 has an aperture which is concentric with and of equal diameter with aperture 11. Lateral surface 25 of shoulder 23 extends from aperture 24 to interior surface 26. Interior surface 26 extends from shoulder 23 to the lead in side of gland 20 and defines a passageway dimensioned to receive the flexible jacketed cable therein. Threaded ridge 27 is integral with surface 26 and extends from the lead in side of gland 20 to just adjacent lateral surface 25. Threaded ridge 27 is dimensioned to deform the exterior jacket of the conduit so as to draw the conduit into gland 20. Threaded ridge 27 may advantageously be a Buttress thread which will draw the jacketed flexible metallic conduit into the gland.

Referring again to FIG. 3, there is shown sleeve 30 which is of conduit material such as plated steel. A conductor receiving passage 32 extends throughout sleeve 30. To form sleeve 30, a length of stock tubing is compressed in a die. Thus, sleeve 30 will have a first cylindrical portion 34, a formed collar 36 and a second cylindrical portion 38. Cylindrical portion 34 has an outside diameter slightly less than the diameter of passageway 11 in body 6 and a length greater than the assembled distance from lateral surface 25 to the remote end of threaded portion 7 (see FIG. 2). The method of assembling the instant connector will be discussed hereinafter. Collar 36 is dimensioned to be larger than aperture 24 and to abut lateral surface 25 of gland 20.

Second cylindrical portion 38 of sleeve 30 has an outside diameter which is selected to establish contact with the flexible metallic conduit of the jacketed flexible metallic conduit. Cylindrical portion 38 has slots 40 and polished sloped surfaces 42 which aide its easy entry into the flexible conduit and provide a spring like element to assure good electrical contact. Cylindrical portion 38 is illustrated in FIG. 5 as being wholly contained with gland 20, however, in some application it may be desirable to have it extend beyond gland 20. In the extended embodiment, portion 38 will serve as a guide as well as providing additional support and compression during rotation of gland 20.

To assemble the connector as a unit, the sleeve 30 is located in gland 20 with cylindrical portion 34 protruding through aperture 24. O-Ring 14 and body 6 are located on cylindrical portion 34. The free end of cylindrical portion 34 is then flared over as shown in FIG. 5 at 34'. As assembled, the gland 20 is drawn into contact with body 6 but is still rotatable. As can be seen in FIG. 5, the assembly process causes O-Ring 14 to be compressed in the cavity formed by body 6, gland 20 and sleeve 30. This forms an effective liquid tight between and among the connector parts at the point of contact. In addition, a gasket ring 16 of compressible gasket material may be located behind collar 36. Gasket ring 16 compensates for any irregularities in the cut end of the jacketed flexible conduit and prevents moisture from seeping back through the threads of gland 20 and into the cable.

Although preferred embodiments of the present invention are disclosed and shown in detail, other modifications and embodiments which would be apparent to one having ordinary skill in the art, are intended to be covered by the spirit and scope of the claims.

What is claimed is:

1. A preassembled liquid tight connector for attaching jacketed flexible metallic conduit to a panel comprising:

a body, said body having a passageway therethrough, a first end adapted for securing said body to said panel and a shoulder portion for abutting said panel, said shoulder further having a counterbore extending from said shoulder to said passageway, a gland, said gland having a ridge which defines an aperture substantially equal in diameter to said passageway in said body, a complimentary counterbore extending from the external side of said ridge to said aperture, a cavity concentric with said aperture, said cavity extending from a conduit receiving side to said ridge and dimensioned to receive said jacketed conduit therein, and fastening means within said cavity for securing said gland to said jacketed conduit, a ground sleeve, said ground sleeve having a first end, said first end having a generally smooth outside diameter dimensioned to achieve an interference fit electrical contact with the metallic core of said jacketed flexible metallic conduit, a collar immediate adjacent said first end, said collar dimensioned to abut said ridge of said gland and a second end immediately adjacent said collar, said second end having an outside diameter dimensioned to achieve electrical contact with said body defining said passageway and a length slightly greater than the combined length of said ridge and said body, and a resilient O-Ring, whereby a connector may be assembled by locating said sleeve in said gland such that said collar abuts said ridge and said second end protrudes through said aperture, said O-Ring is located around said second end prior to locating said body on said second end, said body being oriented on said second end such that said counterbore and said complimentary counterbore cooperate with said second end to surround said O-Ring whereupon said second end is flared against said body thereby drawing said gland toward said body and compressing said O-Ring into liquid tight contact with said second end, said counterbore and said complementary counterbore to form a preassembled liquid tight connector.

2. The connector of claim 1 wherein:
   said fastening means is a thread dimensioned to deform the jacket of said jacketed flexible metallic conduit and form a thread groove in said jacket as said gland is rotated about said conduit.

3. The connector of claim 2 further comprising:
   a compressible gasket ring located within said gland and abutting said collar.

4. The connector of claim 2 wherein:
   said first end of said ground sleeve has one or more slots therein.

5. The connector of claim 4 further comprising:
   a second O-Ring, and
   a groove in said shoulder portion abutting said panel, said groove dimensioned to partially receive said second O-Ring so that upon securing said connector to said panel said shoulder will abut said panel and prevent overtightening and distortion of said second O-Ring.

* * * * *